W. E. LAND.
FERTILIZER DISTRIBUTER.
APPLICATION FILED MAY 14, 1910. RENEWED AUG. 21, 1912.

1,058,375.

Patented Apr. 8, 1913.

3 SHEETS—SHEET 1.

Witnesses
Stuart Hilder.
Francis M. Anderson.

Inventor
W. E. Land
by E. W. Anderson
his Attorneys

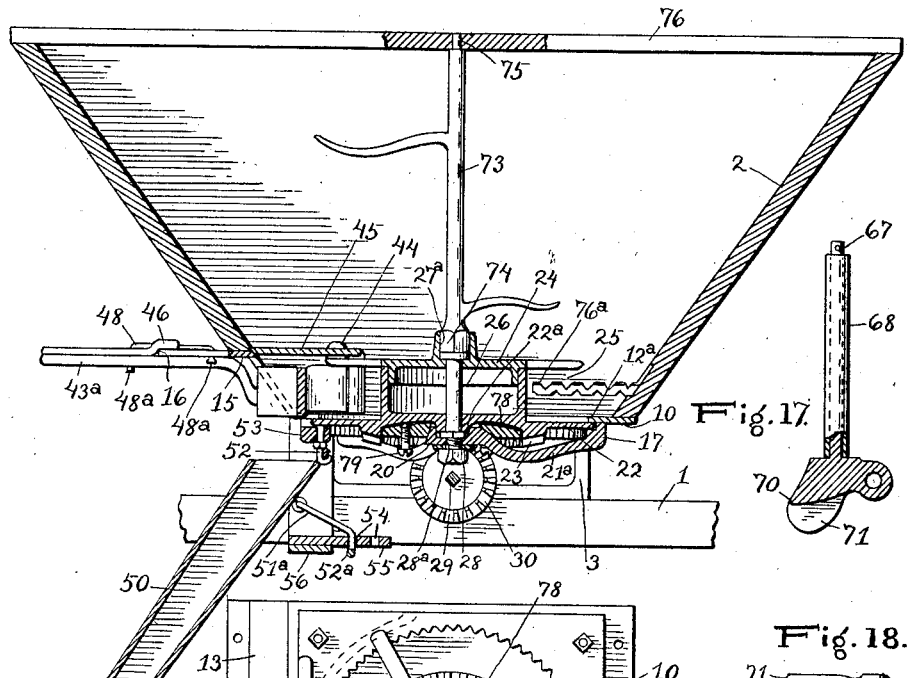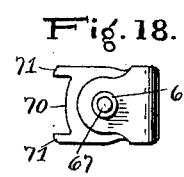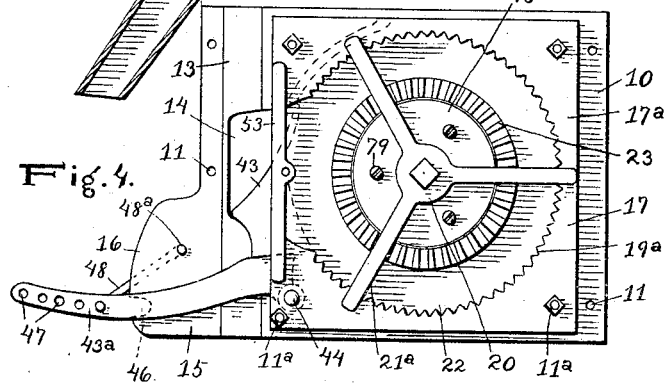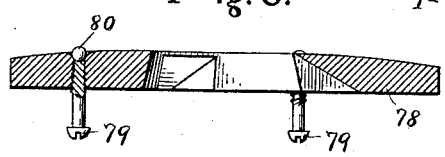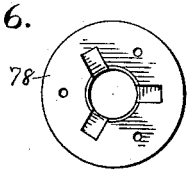

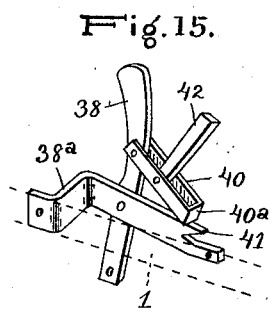
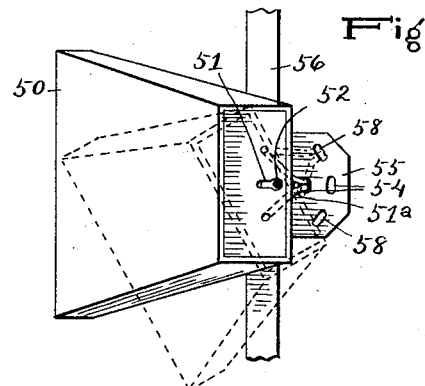
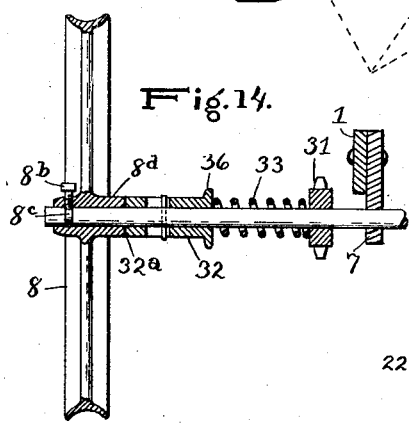
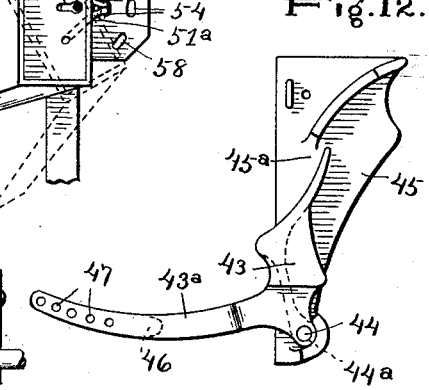
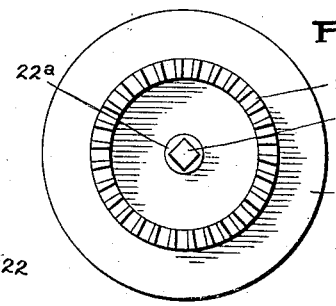
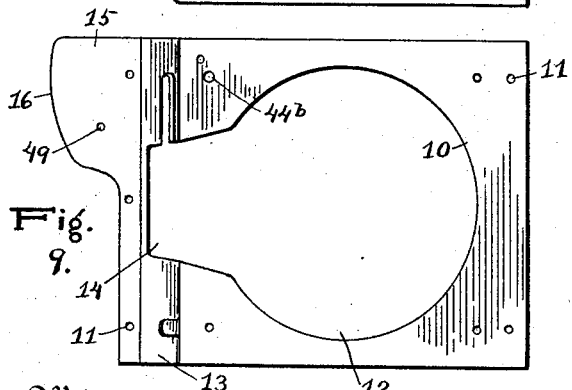
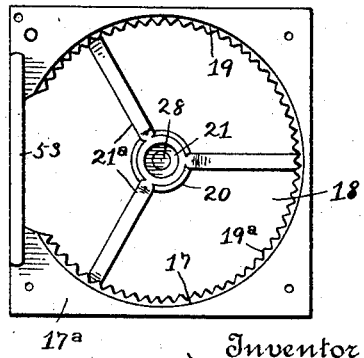

UNITED STATES PATENT OFFICE.

WILLIE E. LAND, OF NORFOLK, VIRGINIA.

FERTILIZER-DISTRIBUTER.

1,058,375.   Specification of Letters Patent.   Patented Apr. 8, 1913.

Application filed May 14, 1910, Serial No. 561,474. Renewed August 21, 1912. Serial No. 716,318.

*To all whom it may concern:*

Be it known that I, WILLIE E. LAND, a citizen of the United States, resident of Norfolk, in the county of Norfolk and State of Virginia, have made a certain new and useful Invention in Fertilizer-Distributers; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
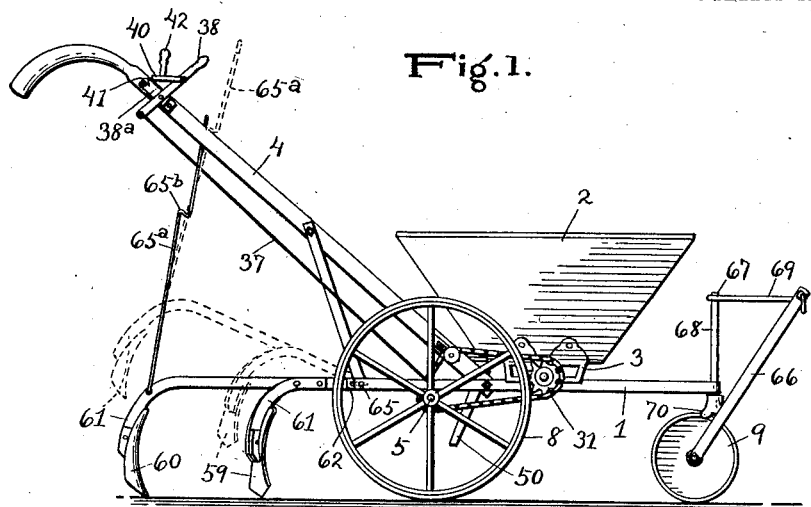
Figure 2:
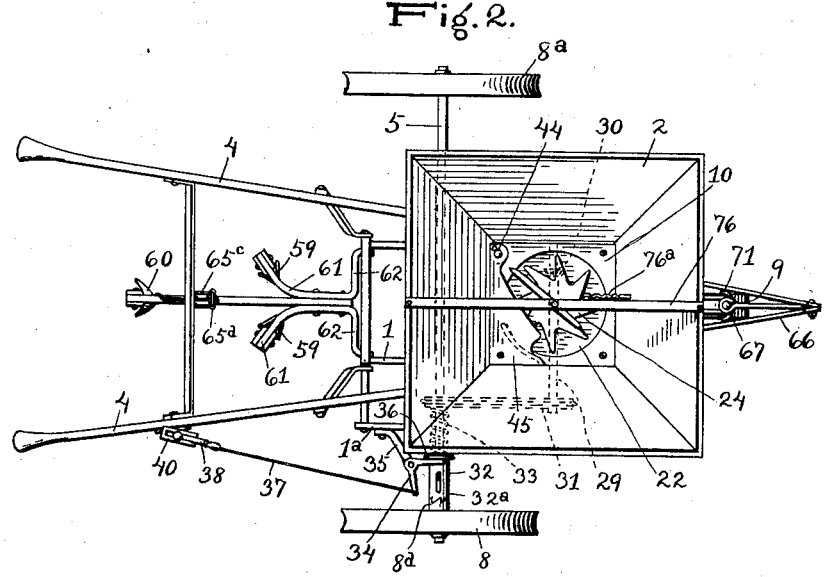

Figure 1 is a side view of the invention, showing the shares or coverers in raised position, in dotted lines; Fig. 2 is a plan view of the invention; Fig. 3 is a detail central cross section of the hopper, the feeding means, and the fertilizer discharge chute; Fig. 4 is a bottom plan view of the feeding means; Fig. 5 is a detail cross section on the line 5—5, of the annular plate carying the set screws having anti-friction bearings at their ends; Fig. 6 is a detail bottom plan view of the same on a smaller scale; Fig. 7 is a detail bottom plan view of the bottom plate of the feeding means; Fig. 8 is a detail side view of the rotary plates of the feeding means; Fig. 9 is a detail plan view of the hopper bottom plate; Fig. 10 is a detail side view of the same; Fig. 11 is a detail plan view of the spider plate; Fig. 12 is a detail bottom plan view of the gate and the cover plate for the gate opening; Fig. 13 is a detail plan view of the fertilizer discharge chute; Fig. 14 is a detail longitudinal section of the clutch upon the axle; Fig. 15 is a detail perspective view of the operating lever for the clutch, showing the catch means therefor; Fig. 16 shows detail longitudinal and cross sections on the lines $x$—$x$ and $y$—$y$, Fig. 2 of the pivotal connection of the share-carrying arms with the frame; Fig. 17 is a detail side view partly in section of the stem for the caster wheel carrying the scraper having side flanges; and Fig. 18 is a plan view of the same.

The invention has relation to fertilizer distributers, and it consists in the novel construction and combination of parts, as hereinafter set forth.

In the accompanying drawings, illustrating the invention, the numerals 1, 1, designate horizontal parallel frame bars, upon which the hopper 2 is supported by means of lateral brackets 3, 3.

4, 4, are upward extending handle bars secured to said frame bars, and 5 is a horizontal axle having journal bearings in brackets 7, 7, of said frame bars, rear wheels 8, 8$^a$ turning loosely upon said axle, each wheel having a set screw or pin 8$^b$, engaging a groove 8$^c$ of the axle, or being otherwise suitably fixed against lateral movement.

9 is a front caster wheel.

10 is a bottom plate for the hopper, to which it is bolted at 11, 11, and having a circular opening 12, and an upward extending side portion 13, provided with a gate opening 14, and an outward extending part 15, having an arcuate edge portion 16.

17 is a spider plate secured below said bottom plate by the bolts 11$^a$, 11$^a$, and having an annular rim portion 17$^a$ and a circular opening 18, as also a narrow depressed or rabbeted annular rim flange 19 for said opening, and a central part 20 having a recess seat 21, and connected with the rim of the spider by radial arms 21$^a$. Fitting between said bottom plate and the spider plate is the circular bottom plate 22 of the feeding means, said plate 22 being seated in the central opening of the spider plate and resting upon the rabbeted rim flange 19, with its upper surface on a level with the top of the rim of the spider plate, said plate 22 having a downward extending central boss 22$^a$ fitting within the recess seat 21 of the spider. The plate 22 has also a downward extending crown gear wheel 23 forming an integral part thereof. The feeding means includes in addition to the bottom plate 22, an upper tangentially toothed plate 24, fitting upon a central hollow upward extending circular portion 22$^b$ of the bottom plate and spaced therefrom by a horizontal interval 25 constituting the feed chamber proper and in alinement horizontally with the gate opening 14. The plates 22 and 24 are rigidly connected together by means of a central rivet bolt 26, the upper head of which is seated within a squared recess 27$^a$ of a central upper extension 27 of the plate 24, and the lower head of which fits within the recess 21 of the central boss of the spider, sufficient clearance being allowed so that the bolt head may turn freely therein. In this way the plate 22 is held between the overlapping rim 12ᵃ of the bottom plate 10 of the hopper and the rim flange of the spider, said plate 22 having a bearing at its circumferential portion upon said rim flange, sufficient clearance being allowed between the rim of the plate 22 and its seat in the spider so that it may turn freely, the joint between said plate and the overlapping rim flange of the plate 10 being relied upon to prevent escape of fertilizer.

The rabbeted or depressed rim flange 19 of the spider is toothed as shown at 19ᵃ in order to clear it of any accumulation of fertilizer, which has a tendency to collect in a finely powdered condition thereupon in the course of time. At its central portion the plate 22 is provided with a downward extending boss 22ᵃ as before stated engaging the recess seat 21 of the boss of the spider in a sufficiently close manner to prevent any lateral movement of the plate 22 in its rotation, which would be liable to cause a bind of the rim of the plate against its seat in the spider. This plate 22 is accurately leveled upon the depressed rim flange of the spider, any side sway or lost motion being thereby prevented. In case of wear of the parts, the bottom plate 22 of the feeding means may be set up to the rim 12ᵃ of the circular opening of the plate 10 to make a close joint therewith by means of a set screw 28 engaging a threaded opening 28ᵃ of the part 20 and adapted to take a bearing against the lower head of the rivet bolt.

In order to turn the feeding means, a horizontal shaft 29 having journal bearings in the brackets 3, 3, is provided with a pinion 30 engaging the crown wheel of the feed plate. Sprocket gearing 31 connects the axle 5 with the shaft 29, by a suitable sprocket chain.

In order to throw the feeding means out of gear with the driving axle when it is desired to turn the machine or it is to be moved upon its supporting wheels but particularly in order that the machine may be turned readily upon its supporting wheels, the wheels 8, 8ᵃ are arranged to turn loosely upon the axle as before stated, a sleeve 32 fast upon said axle having a clutch toothed end 32ᵃ adapted for engagement with a clutch toothed hub 8ᵈ of the wheel 8, a coiled spring 33 surrounding the axle acting to normally effect the clutch and cause the wheel 8 to turn with the axle.

A bell crank lever 34 is fulcrumed to a bracket 35 carried by a frame bar 1ᵃ parallel to and made fast to the frame bars 1, 1, one of the arms of said lever having a bearing against a flange 36 of said sleeve and its other arm having a rod connection 37 with the lower end of an operating lever 38, fulcrumed intermediately of its length to a bracket 38ᵃ at the upper portion of one of the handle bars. When the lever 38 is operated, the bell crank lever is caused to take a bearing against the clutch sleeve to move it out of engagement with the clutch hub of the wheel 8 against the tension of the coiled spring, said lever 38 having a loop-form link 40 pivoted at one end thereof intermediately of the length of the handle or power arm of the lever 38 and being at its other end 40ᵃ adapted for engagement with a hook or tooth 41 of the bracket 38ᵃ, to hold the clutch members 32ᵃ and 8ᵈ out of engagement with each other with the spring under tension. The link 40 is provided with an upward extending handle 42 midway of its length and in close relation to the handle end of the lever 38 and which when pressed forward will release the hook engagement and cause the clutch for the feeding means to be again effected under the influence of the coiled spring.

43 is a gate for the opening 14 of the hopper bottom plate, said gate having a pivot pin 44 loosely engaging a perforation 44ᵃ of the cover plate 45 for the gate opening and a perforation 44ᵇ of the hopper bottom plate, said gate being adapted to close the gate opening 45ᵃ of the cover plate. The gate 43 is provided with an outward extending arm 43ᵃ having a lip 46 spaced horizontally therefrom and having engagement with the arcuate edge portion 16 of the plate 10 to properly support said arm 43ᵃ and prevent any sag thereof. This arm 43ᵃ of the gate is provided with a series of perforations 47, 47, a detachable link connection 48 having downward extending ends 48ᵃ, one of which has a pivotal engagement with a perforation 49 of the plate 10, and the other of which is adapted to engage any one of the perforations 47 to hold the gate in position as adjusted to close the gate opening to the desired degree according to the amount of fertilizer required to be discharged.

A discharge chute 50 is hung below the gate opening in position to receive and spread the fertilizer to a greater or less extent as may be required, said chute having a key-hole shaped slot 51, in the upper part of its rear wall with which a hook support 52 has loose supporting engagement said hook being carried by the cross bar 53 of the spider extending across the gate opening below the same. This chute, which is hung loosely upon its supporting hooks is adapted to assume a greater or less inclination to spread the fertilizer more or less as required, and is supported in the inclined position by means of a pivotal link 51ᵃ carried by the chute and having a down-turned hook end 52ᵃ capable of engagement with any one of a series of perforations 54, 54, of an extension 55 of a cross bar 56 supported from the side frame bars. Should it be desired to spread the fertilizer to one side or the other, the link 51ª is lifted from engagement with a perforation 54, the chute being then shifted to one side, and the hook end of the pivotal link engaged with one or the other of lateral perforations 58, 58, of said part 55, to hold the chute in position as laterally adjusted. Owing to the loose supporting engagement of the hook with the slot of the chute, the chute will readily turn upon said hook to one side or the other to follow automatically any turns in the trench, taking a pivot upon the hook end of the link engaging its seat in the part 55.

59, 59, are shares, inclined toward each other to scrape the dirt from the sides of the trench into a hill to cover the fertilizer as the machine progresses, being followed by a somewhat larger share 60, to mix the fertilizer with the soil of said hill and form a trench in the hill for the reception of the seed, said shares having upward extending carrying arms 61, 61, the two latter of which are spread at 62 having pivotal slot engagement at 63 with sleeves 64, engaged by bolts 65, connecting said parts 62 with the side frame bars of the machine in a rigid manner. Owing to the loose slot engagement of the share carrying arms with the sleeves 64, the shares are adapted to automatically adjust themselves to follow the trench made by the plow for the seed or fertilizer, and owing to the pivotal connection of the carrying arms with the machine, said shares are designed to readily adjust themselves automatically in a vertical direction to avoid obstructions. The shares may be lifted into inoperative position and so held by means of an upward extending rod 65ª having a hook bend 65ᵇ adapted for engagement with a loop 65ᶜ carried by a cross bar connecting the upper portions of the handle bars, and holding the shares in raised position. When the shares are dropped, they are held against dropping too far by engagement of the upper looped end 65ᵈ of said rod with the loop 65ᶜ.

The front caster wheel 9 is mounted in forks 66, a journal stem 67 passing through a sleeve 68 carried at the forward ends of the side frame bars, a forward extending arm 69 connecting the upper end of said journal stem with the upper ends of the forks 66. A scraper 70 is carried by said forks operating to keep the caster wheel clear of dirt, and is provided with downward extending side portions 71 straddling the rim of the wheel and adapted to take the wear thereof from the forks.

Fitting within the hopper is a vertical agitator shaft 73 having a lower squared portion 74 detachably engaging the squared seat of the central extension of the feed plate, said agitator shaft having a rotary bearing at its upper end at 75 in a cross bar 76 at the top of the hopper, and being also provided with lateral wing extensions for stirring up the hopper contents.

A scraper rod 76ª is secured to the side of the hopper and has extension inward under the toothed feed plate to keep the same clear of any accumulation of fertilizer. This scraper rod may be toothed as shown for its more effectual action.

78 is an annular plate fitting within the crown gear wheel of the feed plate and supported upon the radial arms of the spider, said plate having upward extending set screws 79, three are shown, and carrying at their upper ends each an anti-friction ball bearing 80, adapted to be set up against the feed plate 22, so that said plate and the parts supported thereby may turn upon ball bearings.

When it is desired to remove the gate from the machine, all that is required is to take out the loose pivot pin thereof when the gate may be readily withdrawn for cleaning or other purpose.

The chute for spreading the fertilizer may also be readily detached from the machine by lifting its pivotal link 51ª from engagement with the perforation of the part 55, and lifting the chute bodily from its hook support.

Having thus described my invention, what I claim as new and desire to secure by Letters Patent is:—

1. In a fertilizer distributer, a carrying frame, a hopper supported thereby, feeding means at the bottom of the hopper, a rotary shaft having an annular groove at one end a sprocket wheel rigidly secured to said shaft and provided with a driving connection with said feeding means, loose carrying wheels upon said axle, one of said wheels having a clutch-toothed hub provided with a pin having rotatable engagement with said annular groove, a slidable sleeve rotatable with said axle and provided with a clutch-toothed end for engagement with said hub, a coiled spring upon said axle between said sprocket wheel and said sleeve and acting to normally effect the clutch of the hub and sleeve, a lever device for effecting disengagement of the hub and sleeve to throw the feeding means out of operation, and means for holding said sleeve in position disengaged from said hub.

2. In a fertilizer distributer, a carrying frame, a hopper supported thereby, feeding means at the bottom of the hopper, a rotary shaft having an annular groove at one end a sprocket wheel rigidly secured to said shaft and provided with a driving connection with said feeding means, loose carrying wheels upon said axle, one of said wheels having a clutch-toothed hub provided with a pin having rotatable engagement with said annular groove, a slidable sleeve rotatable with said axle and provided with a clutch-toothed end for engagement with said hub, a coiled spring upon said axle between said sprocket wheel and said sleeve and acting to normally effect the clutch of the hub and sleeve, a bell crank lever one arm of which has engagement with said sleeve, an operating lever having a connecting rod with the other arm of said bell crank lever, and catch means for said operating lever when actuated to release the clutch of the hub and sleeve to hold said sleeve in position disengaged from said hub.

3. In a fertilizer distributer, a carrying frame, a hopper supported thereby, a rotary axle having journal bearings in said frame, feeding means at the bottom of the hopper comprising a hopper bottom plate having a circular opening, a spider plate having a large annular rabbeted recess seat and a central part provided with a small annular rabbeted recess seat and a central opening, a feed plate fitting in said large annular recess seat between the same and said hopper bottom plate and having a central boss fitting in the recess seat of said central part of the spider plate, said feed plate having a lower crown gear wheel and an upper extension carrying a tangentially toothed plate, a bolt connecting said feed plate and spider plate fitting in said opening of the central part of the spider plate, means for operating said crown gear wheel and feed plate having a driving connection with said axle, and loose carrying wheels upon said axle.

4. In a fertilizer distributer, a carrying frame, a hopper supported thereby, a rotary axle having journal bearings in said frame, feeding means at the bottom of the hopper comprising a hopper bottom plate having a circular opening, a spider plate having an annular recess seat and a central part provided with a recess seat, a feed plate fitting in said annular recess seat between the same and said hopper bottom plate and having a central boss fitting in the recess seat of the central part of the spider plate, said feed plate having a lower crown gear wheel and an upper extension carrying a tangentially-toothed plate provided with a central upper extension having a squared seat, a bolt connecting said feed plate and said tangentially-toothed plate, means for operating said crown gear wheel and said feed plate having a driving connection with said axle and loose carrying wheels upon said axle.

5. In a fertilizer distributer, a carrying frame, a hopper supported thereby, a rotary axle having journal bearings in said frame, feeding means at the bottom of the hopper, comprising a hopper bottom plate having a circular opening, a feed plate fitting upon said hopper bottom plate and having an upward extension carrying a tangentially-toothed plate, a scraper rod attached at one end to the hopper and having extension under said tangentially-toothed plate, means for operating said feed plate having a driving connection with said axle, and loose carrying wheels upon said axle.

6. In a fertilizer distributer, a carrying frame, a hopper supported thereby, a rotary axle having journal bearings in said frame, feeding means at the bottom of said hopper including a hopper bottom plate having a gate opening, a pivotal gate controlling said opening and having a loose pivot drop-pin engaging said hopper bottom plate, a hook upon the carrying frame, a fertilizer spreader chute below said gate opening having loose detachable engagement with said hook, means for operating said feed plate having a driving connection with said axle, and loose carrying wheels upon said axle.

7. In a fertilizer distributer, a carrying frame, a hopper supported thereby, a rotary axle having journal bearings in said frame, feeding means at the bottom of the hopper including a hopper bottom plate having a gate opening, a detachable pivotal gate controlling said opening and having a loose pivot drop-pin, a hook upon the carrying frame below the hopper, a fertilizer spreader chute below said gate opening having loose detachable engagement with said hook, means for operating said feeding means having a driving connection with said axle, and loose carrying wheels upon said axle.

8. In a fertilizer distributer, a carrying frame, a hopper supported thereby, a rotary axle having journal bearings in said frame, feeding means at the bottom of the hopper including a hopper bottom plate having a gate opening, a detachable pivotal gate controlling said opening and having a loose pivot drop-pin, a hook upon the carrying frame below said gate opening, a plate upon said carrying frame below the hopper having a central series of perforations and lateral perforations, a fertilizer spreader chute below said gate opening having loose detachable engagement with said hook and a pivotal link having adjustable engagement with any one of the perforations of said plate to hold the chute in inclined position and in laterally adjusted position, means for operating said feeding means having driving connection with said axle, and loose carrying wheels upon said axle.

9. In a fertilizer distributer, a carrying frame, a hopper supported thereby, a rotary axle having journal bearings in said frame, feeding means at the bottom of the hopper, a plate upon the carrying frame having a central series of perforations and lateral perforations, a hook upon the carrying frame, a fertilizer spreader chute having loose detachable engagement with said hook and a pivotal link having a hook end adjustably engaging any one of the central perforations of said plate to hold the chute in inclined position at different inclinations, and adjustable engagement with the lateral perforations of said plate to hold the chute in position as laterally adjusted, said chute being loosely hung and laterally adjustable to automatically follow the trench, means for operating said feeding means having driving connection with said axle, and loose carrying wheels upon said axle.

10. In a fertilizer distributer, a carrying frame, a hopper supported thereby, a rotary axle having journal bearings in said frame, feeding means at the bottom of the hopper, a fertilizer spreader chute, share-carrying arms having pivotal connection with said frame, lateral shares inclined toward each other and a central share in rear of said lateral shares carried by said arms, a rod having supporting engagement with said frame and pivotal connection with said arms to hold the same and the shares carried thereby in operative position, said rod having vertical adjustment to allow automatic upward movement of the shares to avoid obstructions, means for operating said feeding means having driving connection with said axle, and loose carrying wheels upon said axle.

In testimony whereof I affix my signature, in presence of two witnesses.

WILLIE E. LAND.

Witnesses:
  M. R. LAND,
  ROBERT VANDENTER, Jr.

---

Copies of this patent may be obtained for five cents each, by addressing the "Commissioner of Patents, Washington, D. C."